United States Patent [19]

Blischke et al.

[11] Patent Number: 5,335,538

[45] Date of Patent: Aug. 9, 1994

[54] METHOD AND ARRANGEMENT FOR DETERMINING THE STORAGE CAPACITY OF A CATALYTIC CONVERTER

[75] Inventors: Frank Blischke, Stuttgart; Erich Schneider, Kirchheim; Eberhard Schnaibel, Hemmingen, all of Fed. Rep. of Germany

[73] Assignee: Robert Bosch GmbH, Stuttgart

[21] Appl. No.: 937,411

[22] Filed: Aug. 31, 1992

[30] Foreign Application Priority Data

Aug. 30, 1991 [DE] Fed. Rep. of Germany ....... 4128823

[51] Int. Cl.$^5$ .......................................... G01M 15/00
[52] U.S. Cl. .................................................... 73/118.1
[58] Field of Search .......................... 73/118.1; 60/277; 340/438; 364/424.03, 424.05, 431.01

[56] References Cited

U.S. PATENT DOCUMENTS 3,969,932 7/1976 Rieger et al. .
5,165,230 11/1992 Kayanuma et al. ................. 73/118.1
5,177,463 1/1993 Bradshaw et al. .................. 340/438

Primary Examiner—Robert Raevis
Attorney, Agent, or Firm—Walter Ottesen

[57] ABSTRACT

The invention is directed to a method for determining the storage capacity of a catalytic converter of an internal combustion engine with the aid of a first signal from an oxygen-indicating first probe mounted forward of the catalytic converter and a second signal from an oxygen-indicating second probe mounted rearward of the catalytic converter. The first and second signals show the change from rich to lean and vice versa and the method includes the steps of: determining the storage capacity as a quantity proportional to the time-dependent integral of an integration variable; starting the integration at a time point at which said first signal changes from rich to lean or vice versa; and, ending the integration after a time interval. The method does not need a special test operation of the engine to determine the storage capacity of the catalytic converter. Instead, the method can be carried out in any steady-state operating condition for which the probe rearward of the catalytic converter regularly indicates jumps from rich to lean and vice versa. The invention is also directed to an arrangement for carrying out the invention.

5 Claims, 3 Drawing Sheets

METHOD AND ARRANGEMENT FOR DETERMINING THE STORAGE CAPACITY OF A CATALYTIC CONVERTER

BACKGROUND OF THE INVENTION

Numerous methods and arrangements are known for determining the performance deterioration or the storage capacity of a catalytic converter. These methods and arrangements utilize the signals of oxygen-indicating probes of which one is mounted forward of the catalytic converter and the other rearward thereof. Of special interest with respect to the following are a method and arrangement described in U.S. Pat. No. 3,969,932. The method is carried out on an internal combustion engine having a lambda control for which, in order to make a time measurement, engine speed and load are so adjusted that a pregiven constant flow of gas takes place through the catalytic converter. The engine is then driven in a first operating state having a lambda value of 0.95 or 1.05, that is, a value deviating from one until the catalytic converter in the case of rich operation (that is, the value 0.95) has reached a first storage end state and, in the case of lean operation (that is, the value 1.05) the other storage end state.

For this purpose, a certain time is needed for which it is indicated that it is the time within which the catalytic converter is completely filled with a reducing exhaust gas component or is liberated from this component by oxidation. Actually, a catalytic converter does not store the reducing components but instead stores oxygen. Accordingly, for lean operation, a stored reducing component is not oxidized; rather, oxygen is stored. During rich operation, it is not reducing components which are stored; rather, stored oxygen is consumed by oxidation of reduced components.

After the storage state of the catalytic converter has been transferred in the mentioned first operating state into one of the above-mentioned end positions, that is filled or empty with reference to oxygen, the engine is operated from a start time point in a second operating state with a lambda value deviating from one in the other direction, that is 1.05 or 0.95 whereby the lambda value measured forward of the catalytic converter changes in a corresponding direction and exceeds a threshold at a start time point. The time is measured starting from the start time point and that time point at which the lambda value measured rearward of the catalytic converter runs in the direction of the lambda value present forward of the catalytic converter and thereby exceeds another threshold. This time is a measure for the storage capacity and therefore for the deterioration state of the catalytic converter.

The corresponding arrangement of the invention has an operating state control and a time measuring unit for carrying out the method of the invention.

It is a disadvantage of this method that operating states must be adjusted with well defined air flow and well defined lambda value in order to be able to determine the storage capacity. The method and the arrangement are therefore not useable at any desired steady-state operating states.

Accordingly, the problem was present to provide a method and an arrangement for determining the storage capacity of a catalytic converter which are useable for any desired steady-state operating conditions of the internal combustion engine on which the catalytic converter is operated.

SUMMARY OF THE INVENTION

The method of the invention is for determining the storage capacity of a catalytic converter with the aid of a first signal $\lambda\_V$ from an oxygen-indicating first probe mounted forward of the catalytic converter and a second signal $\lambda\_H$ from an oxygen-indicating second probe mounted rearward of the catalytic converter, these first and second signals showing the change from rich to lean and vice versa. The method includes the steps of: determining the storage capacity as a quantity proportional to the time-dependent integral of an integration variable $\Delta\lambda\_V(t) \cdot LM(t)$; starting the integration at a time point $T\_0$ at which the first signal changes from rich to lean or vice versa; and, ending the integration after a time interval $t\_S$ wherein:

$\Delta\lambda\_V(t) = \lambda\_V(t) - 1$;

$LM(t)$ = air mass flow into the engine and therefore also into the catalytic converter;

$t\_S = t\_PS - (t\_GV + t\_GKH)$;

$t\_PS$ = measured phase shift time of the signals of the first and second probes;

$t\_GV = k1/LM$ = gas running time from the first probe to the forward end of the catalytic converter;

$t\_{GKH} = k2/LM$ = gas running time from the forward end to the second probe; and, k1 and k2 = constants dependent upon the arrangement of the probes and the volume of the catalytic converter.

When the storage capacity is to be precisely determined, that is, not only a value proportional to this storage capacity, then the quantity $k3 \cdot \Delta\lambda\_V(t) \cdot LM(t)$ is used as an integration quantity with the constant k3 being the oxygen content of the air.

In order to simplify the computation, it is advantageous to set the value $LM(t)$ to the value $LM(T\_0)$ for the entire integration at the start of the integration procedure and only after integrating the quantity $\Delta\lambda\_V(t)$ to undertake a single multiplication with this value.

In order to make possible digital data processing, it is advantageous to carry out the integration as a summation over discrete values of the integration variable with these values being formed at fixed scanning time points $t\_AT$ and the number n of the summands is determined as an integer number part of the fraction $t\_S/t\_AT$.

The arrangement of the invention is for determining the storage capacity of a catalytic converter and includes: an oxygen-indicating first probe mounted forward of the catalytic converter for supplying a first signal $\lambda\_V$; an oxygen-indicating second probe mounted rearward of the catalytic converter for supplying a second signal $\lambda\_H$; the first and second signals showing the change from rich to lean and vice versa; a time-determining apparatus for determining a storage time interval $t\_S$ according to the equation:

$$t\_S = t\_PS - (t\_GV + t\_GKH)$$

wherein:

$t\_PS$ = measured phase shift time of the signals of the first and second probes;

$t\_GV = k1/LM$ = gas running time from the first probe to the forward end of the catalytic converter;

$t\_GKH = k2/LM$ = gas running time from the forward end to the second probe; and, k1 and k2 = constants dependent upon the arrangement of the probes and the volume of the catalytic converter.

The time-determining apparatus includes an integration unit for computing the time-dependent integral of an integration variable $\Delta\lambda\_V(t)\cdot LM(t)$; the integration beginning at time point $T\_0$ at which the first signal changes from rich to lean or vice versa; and, the integration ending after a time interval $t\_S$ and the time integral being proportional to the storage capacity, wherein:

$\Delta\lambda\_V(t) = \lambda\_V(t) - 1;$ $LM(t)$ = air mass flow into the engine and therefore also into the catalytic converter.

The method and arrangement of the invention afford the advantage that they do not require any special kind of test operation of the internal combustion engine; instead, any stationary operating condition can be used at which a phase shift can be determined between the signals of the probes forward and rearward of the catalytic converter. At this point, it is noted that for steady-state operation with a new catalytic converter, such a phase shift cannot be determined since the catalytic converter converts so well that the probe mounted rearward thereof continuously shows the lambda value one. However, when the storage capacity of the catalytic converter becomes less with increasing deterioration, its buffer capacity for taking up oxygen during lean phases and for releasing oxygen during rich phases is no longer adequate in order to maintain continuously the lambda value one at the output for changing values at the input and it is for this reason that during normal lambda control operation, phase shifts between the above-mentioned probe signals can be determined.

Furthermore, the method of the invention and the arrangement of the invention afford the advantage that they consider that the above-mentioned phase shift of the probe signals is not a direct measure for the storage capacity of the catalytic converter; however, the gas running times are also to be considered.

The arrangement of the invention is in practice realized with a correspondingly programed microcomputer.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
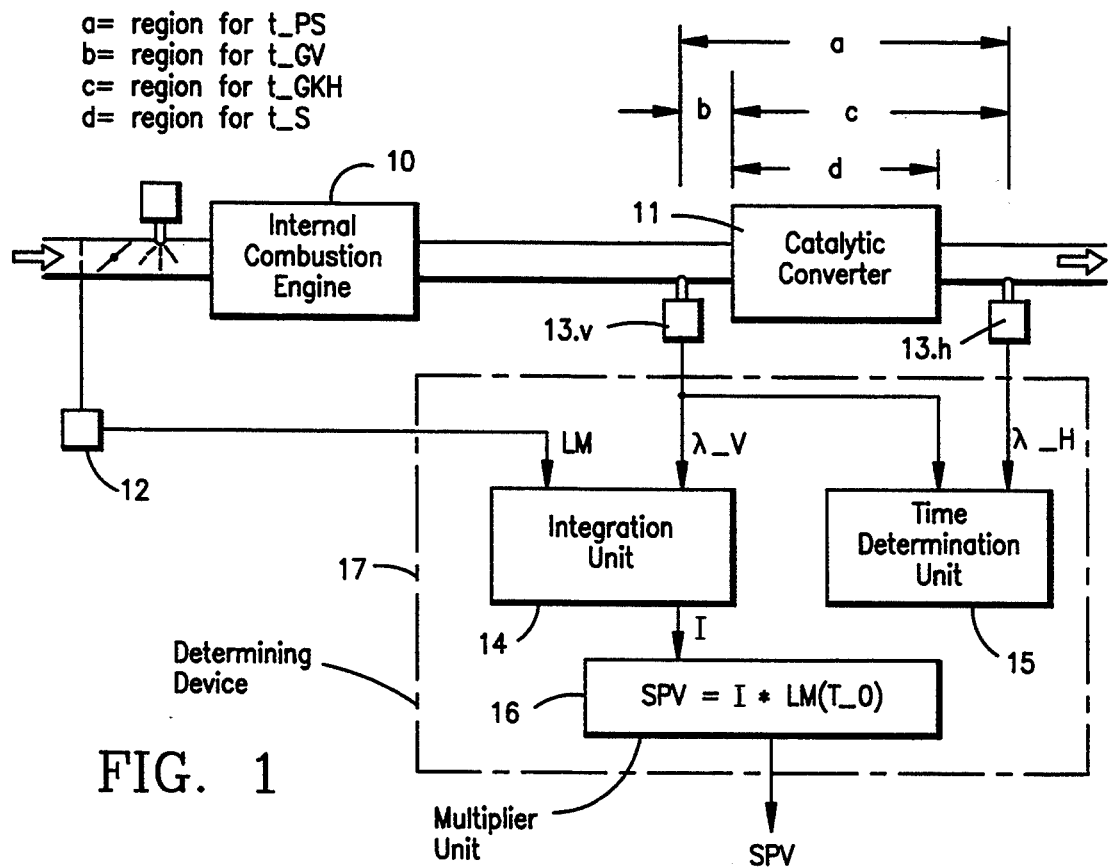
FIG. 1 is a schematic block diagram of an internal combustion engine having a catalytic converter and an arrangement for determining the storage capacity of the catalytic converter.

FIG. 1 shows an engine 10, a catalytic converter 11, an air-flow sensor 12 mounted forward of the engine 10, a forward lambda probe 13.v forward of the catalytic converter 11, a rearward lambda probe 13.h rearward of the catalytic converter and a determining device 17 which has an integration unit 14, a time-determination unit 15 and a multiplier unit 16. The integration unit 14 receives a signal representing the air-mass flow LM from the air-flow sensor 12, a signal $\lambda\_V$ from the forward lambda probe 13.v and trigger signals from the time-determination unit 15 for starting and ending of an integration operation.

The time-determination unit 15 receives the signal $\lambda\_V$ as well as a signal $\lambda\_H$ from the rearward lambda probe 13.h. It is noted that for the signal $\lambda\_V$, it is especially significant that this signal changes in proportion to the lambda value. This is the case so that the integration unit can correctly set up the oxygen balance for the catalytic converter 11. For the signal $\lambda\_H$, it is in contrast not necessary that this signal change linearly with the lambda value since it is only used to determined whether the gas rearward of the catalytic converter shows a change of the lambda value one toward lean or from lambda value one to rich. For this purpose, the voltage signal of a lambda probe can be used which, depending upon the type of probe, changes more or less non-linearly with the lambda value.

Figure 2:
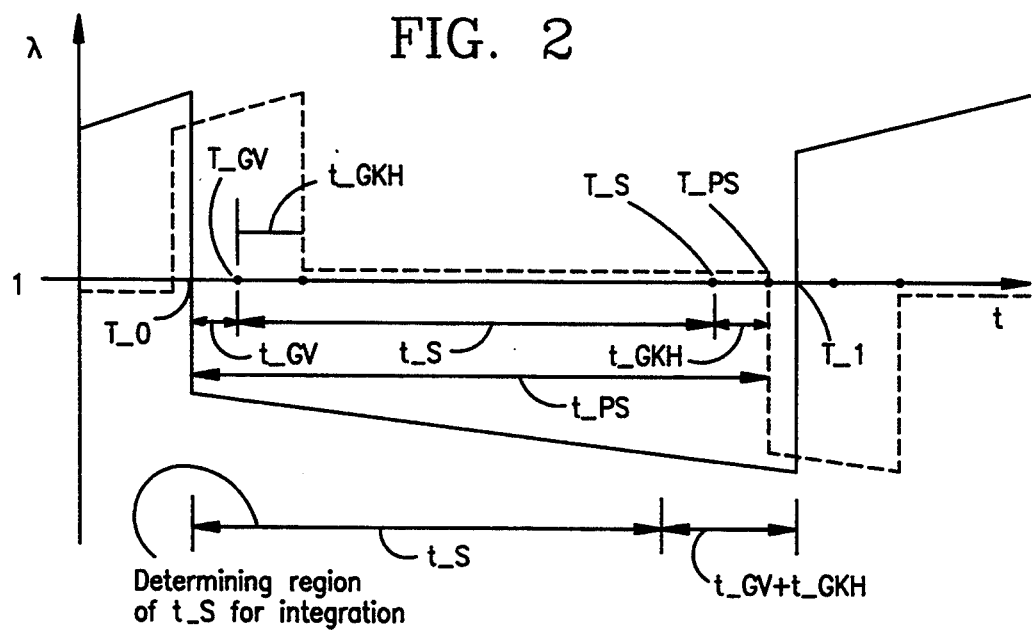
FIG. 2 is a schematic diagram showing the time trace of the lambda values as measured by a probe forward of the catalytic converter (solid line) and a probe mounted rearward of the catalytic converter (broken line); and, FIGS. 3A and 3B show a flowchart for explaining an embodiment of the method of the invention as carried out by the arrangement according to FIG. 1.

Reference is first made to FIG. 2 in order to explain the functions of the integration unit 14, the time-determination unit 15 and the multiplier unit 16. In FIG. 2, as in the remainder of the disclosure, time points are identified by T and time spans are identified by t.

In FIG. 2, the lambda value signal $\lambda\_V$ is shown as a solid line and has abrupt transitions. At a time point $T\_0$, the signal at the forward probe 13.v jumps from lean (lambda value greater than one) to rich (lambda value less than one). At a time point $T\_1$, the reverse transition takes place. The mixture becomes increasingly richer between the two time points $T\_0$ and $T\_1$. Correspondingly, the mixture becomes increasingly lean in a time span following the time point $T\_1$ up to a new time point $T\_\_0$.

An investigation will now be made as to when the signal of the rearward probe 13.h likewise leaves the value lean after the time point $T\_0$. Here, it is first noted that the front of the rich mixture after passing the forward lambda probe 13.v requires a time span $t\_GV$ up to a time point $T\_GV$ until the mixture reaches the catalytic converter. In the catalytic converter, the gas front changes its character since the rich component is oxidized by the stored oxygen so that a boundary between rich and lean is no longer present; instead, there is a boundary between exhaust gas of lambda value one and lean exhaust gas. This front requires the time span $t\_GKH$ to run through the catalytic converter and the path from the end of the catalytic converter to the rearward probe 13.h. The lambda value at the rearward probe jumps from a value for lean mixture to the value one at the corresponding time point $T\_GKH$.

An investigation is now made as to when the signal at the rearward probe 13.h jumps from the value one to a value which indicates a rich mixture. Here it is to be noted that starting at the above-mentioned time point $T\_GV$, a storage time span $t\_S$ begins wherein the catalytic converter converts toxic gas components in that the converter makes stored oxygen available. Assuming that the oxidation process takes place uniformly over the entire storage volume, then after the time span $t\_S$ has run, the limit between rich exhaust gas and exhaust gas having the value one lies just at the forward end of the catalytic converter. Additional rich exhaust gas which then flows in requires the gas running time span t GKH from the forward end of the catalytic converter up to the rearward probe 13.h. As soon as this time span has run at a time point $T\_PS$, the signal of the rearward probe jumps from lambda value one to the lambda value for rich exhaust gas. The time span t_PS between the time points T_0 and T_PS can be easily measured since this is a phase shift between the signals of the two probes 13.v and 13.h. The time span t_PS is made up additively from the time spans t_GV, t_S, and t_GKH. For the storage time span t_S which is ultimately of interest, the following applies:

$$t\_S = t\_PS - (t\_GV + t\_GKH) \quad (1)$$

In this equation, the variable t_PS is measured and the gas running time spans t_GV and t_GKH are computed from constants k1 and k2, respectively, and the air-flow signal LM to be k1/LM and k2/LM, respectively. The values of the constants are dependent on the geometry of the exhaust gas channel and of the catalytic converter as well as on the distances of the probes from the catalytic converter. The air-mass signal LM(t) is assumed to be constant during the entire applicable time. This applies with a good approximation since essentially steady-state operating conditions are present and the time span between the time points T_0 and T_1 in FIG. 2 lie typically at approximately 1 second. For LM, the value LM(T_0) is used in the embodiment.

The actual storage capacity SPV of the catalytic converter is determined by the integral quantity of oxygen which is used during the storage time span t_S; whereas, rich exhaust gas is supplied and stored during the time that lean exhaust gas flows in. Accordingly, the following equation applies:

$$SPV = \int_{t=T\_0}^{T\_0+t\_S} (k3 \cdot \Delta\lambda\_V(t) \cdot LM(t)) dt \quad (2)$$

Here, $\Delta\lambda\_V(t)$ has the value $\lambda\_V(t) - 1$ and k3 provides the component of oxygen in air. The integration does not start at the time point T_GV at which the mixture measured at time point T_0 reaches the catalytic converter; instead, the integration begins at the time point T_0 because starting at this time point, the mixture important for the restorage in the catalytic converter is determined.

As mentioned above, it is purposeful to set LM(t) to the fixed value LM(T_0). Also another value measured between the time points T_0 and T_1 could be used. The value of the constant k3 can be arbitrarily set to one when the exact quantity of storable oxygen is not required but only a value is important which is proportional to the exact storage capacity. Then, the following equation applies:

$$SPV = LM(T\_0) \cdot \int_{t=T\_0}^{T\_0+t\_S} \Delta\lambda\_V(t) dt \quad (3)$$

The integration is formed for digital data processing by a summation of summands which are formed after fixed scanning time spans t_AT have run. With respect to the storage time span t_S, the number of scans n = t_S/t_AT is present, that is summands. From equation (2), the following equation then results:

$$SPV = \sum_{m=1}^{n} k3 \cdot \Delta\lambda\_V(T\_m) \cdot LM(T\_m) \quad (4)$$

From equation (3), the following simplified summation equation follows:

$$SPV = LM(T\_0) \cdot \sum_{m=1}^{n} \Delta\lambda\_V(T\_m) \quad (5)$$

In equations (4) and (5), T_m identifies the scanning time points between the time point T_0 and the time point T_0+t_S.

The above description applies to the jump from lean to rich. In FIG. 2, the precise time trace for the reverse jump from rich to lean is not shown; however, it is apparent that the processes described above are repeated as a mirror image on the straight line for the lambda value one with the corresponding time pattern.

A method for determining the storage capacity of the catalytic converter 11 is described below with respect to FIGS. 3A and 3B. The method can be carried out by the determination arrangement 17 of FIG. 1. The method uses equation (5). Before the method starts, a fault counter FZ and a check counter PZ are each set to zero and a fault flag FFL is reset.

Figure 3A:
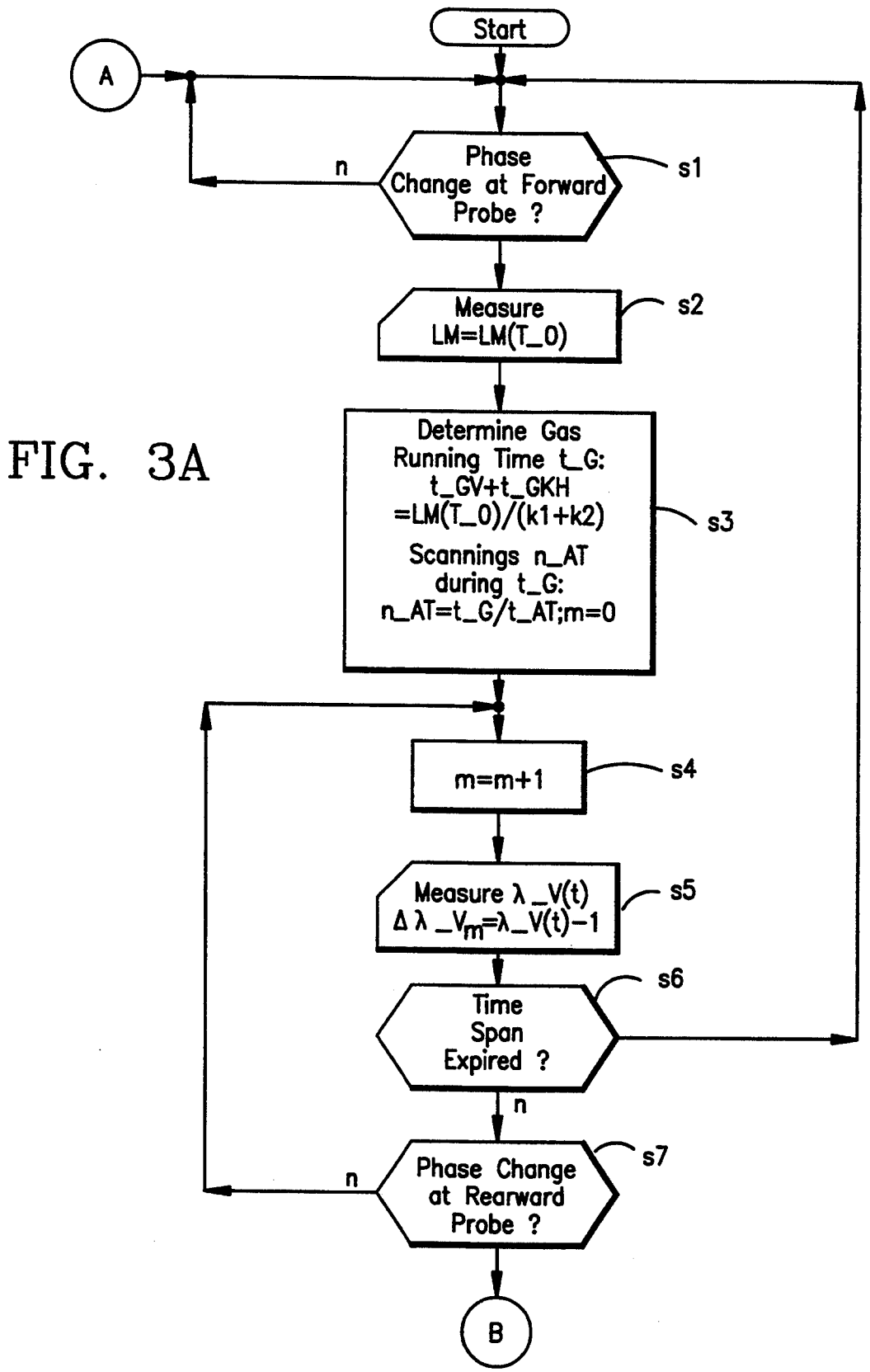
Figure 3B:
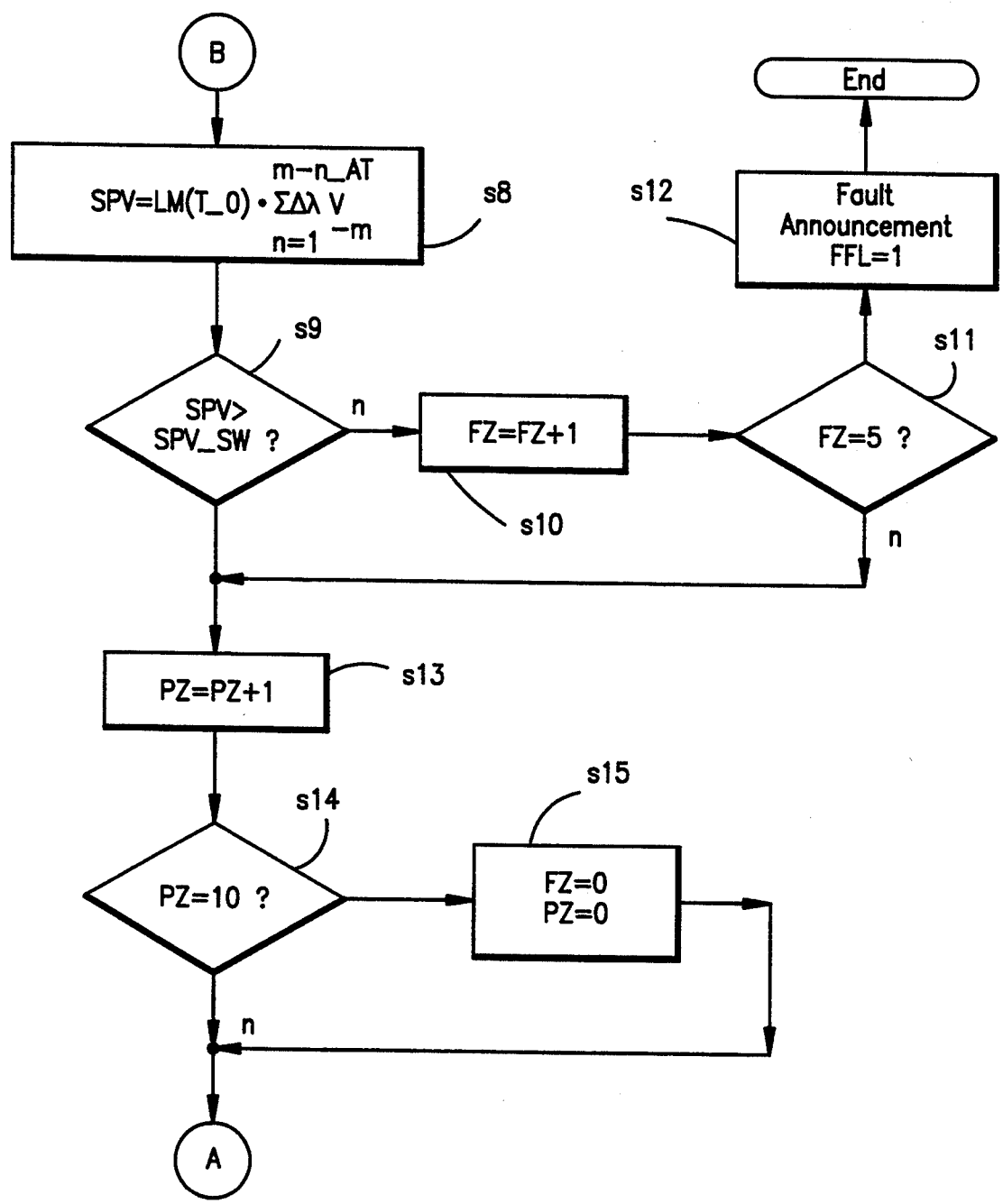

The method of FIGS. 3A and 3B is started each time as soon as a steady-state operating condition of the internal combustion engine 10 is present and the fault flag is still reset. First, steps s1 to s3 are run through and reference may be had to FIG. 3A for their complete content. In these steps, a change from rich to lean or vice versa (phase change) at the forward probe is awaited and as soon as such a phase change occurs, the value LM(T_0) of the air-mass flow signal LM(T_0) is measured and different values are computed therefrom.

Then, a phase change at the rearward probe is awaited. If such a phase change does not occur within a fixed time span, the method returns to the start. The time span can be dependent upon the operating state of the engine and typically lies between 0.5 and 3 seconds. In the entire time up to the occurrence of the phase change at the rearward probe, the signal $\lambda\_V$ of the forward probe is scanned in time intervals t_AS and all scanned values are stored. The above is the subject matter of steps s4 to s7. With the stored values, tile sum according to equation (5) is formed in step s8.

A fault routine follows and reference can be made to blocks s9 to s15 of FIG. 3B for the content of this routine. First, the storage capacity computed in step s8 is compared to a threshold value. If there is a drop below this threshold value, then the fault counter FZ in incremented. As soon as five faults are determined within ten measurements (counted by test counter PZ), the method is ended with a fault announcement. Otherwise, the method continues from the start. It is not important here as to how the fault announcement takes place since only the manner is of interest as to how a value for the storage capacity of the catalytic converter 11 is obtained but not for what purpose this value is then used.

In the fault announcement step s12, the fault flag FFL is set in order to prevent that the method runs through again even though a fault has already been determined. The flag is then reset by the service station when tile station replaces the catalytic converter with a new one.

The method sequence described above can be varied in many ways. It is only essential for a sequence of the invention that the storage capacity is computed with the aid of the time span t_S required for emptying and filling the converter with reference to oxygen and the quantity of oxygen released during this time span or received during this time span. The start the above-mentioned time span is determined with the aid of the time point of a phase change at the forward probe; whereas, the end of the time span is determined from the phase shift time span t_PS defined above and the above-mentioned gas running time spans t_GV and t_GKH.

The method and arrangement described above function especially well when evaluations for the storage capacity only then take place when, at each transition from rich to lean or vice versa at the forward probe, a corresponding transition at the rearward probe takes place. Thus, integrations take place to determine the oxygen accepted or released only over relatively short operating times so that it cannot lead to a continuation of the fault and a fault increase over several transitions at the forward probe for which only a single transition at the rearward probe is present. The inquiry in step s6 takes place to maintain this condition as reliable as possible.

It is understood that the foregoing description is that of the preferred embodiments of the invention and that various changes and modifications may be made thereto without departing from the spirit and scope of the invention as defined in the appended claims.

What is claimed is:

1. A method for determining a value SPV for the oxygen storage capacity of a catalytic converter in the exhaust gas flow of a motor vehicle equipped with a control apparatus, the method comprising the steps of:
providing a first signal $\lambda\_V$ from an oxygen-indicating first probe mounted upstream of said catalytic converter with said first signal $\lambda\_V$ showing the change from rich to lean and vice versa;
providing a second signal $\lambda\_H$ from an oxygen-indicating second probe mounted downstream of said catalytic converter with said second signal $\lambda\_H$ likewise showing the change from rich to lean and vice versa;
determining said value SPV in said control apparatus by integrating an integration variable with said integration variable being the product $\Delta\lambda\_V(t) \cdot LM(t)$;
starting the integration at a time point $T\_0$ at which said first signal changes from rich to lean or vice versa; and,
ending the integration after a time span $t\_S$ with said time span $t\_S$ being dependent upon a measured phase shift time $t\_PS$ of said first and second signals of said probes and from the gas running time $t\_GV$ and $t\_GKH$, wherein:
$\Delta\lambda\_V(t) = \lambda\_V(t) - 1$ = instantaneous deviation of the lambda value of 1;
$LM(t)$ = air mass flow in the engine;
$t\_S = t\_PS - (t\_GV + t\_GKH)$ = direction of the integration;
$t\_PS$ = measured phase shift time of the signals of said first and second probes;
$t\_GV = k1/LM$ = gas running time from said first probe to the upstream end of the catalytic converter;
$t\_GKH = k2/LM$ = gas running time from said upstream end of said catalytic converter to said second probe downstream of said catalytic converter; and,
k1 and k2 = constants dependent upon the arrangement of said probes and the volume of said catalytic converter.

2. The method of claim 1, wherein the variable $k3 \cdot \Delta\lambda\_V(t) \cdot LM(t)$ is used as said integration variable with the constant k3 being indicative of the oxygen content the air.

3. The method of claim 1, wherein said LM(t) is set for the entire integration to the value $LM(T\_0)$ at the start of the integration procedure.

4. The method of claim 1, wherein the integration is carried out as a sun, nation over discrete values of the integration variable with these values being formed in the spacing of a fixed scanning time interval $t\_AT$ and the number n of the sun, hands being determined as an integer component of the fraction $t\_S/t\_AT$.

5. An arrangement for determining a value SPV for the storage capacity of a catalytic converter in the exhaust gas flow of a motor vehicle, the arrangement comprising:
an oxygen-indicating first probe mounted forward of the catalytic converter for supplying a first signal $\lambda\_V$;
an oxygen-indicating second probe mounted rearward of the catalytic converter for supplying a second signal $\lambda\_H$;
said first and second signals showing the change from rich to lean and vice versa;
a time-determining apparatus connected to said probes for receiving said signals to determine therefrom a storage time interval $t\_S$ according to the equation:

$$t\_S = t\_PS - (t\_GV + t\_GKH)$$

wherein:
$t\_PS$ = measured phase shift time of the signals of said first and second probes;
$t\_GV = k1/LM$ = gas running time from said first probe to the forward end of the catalytic converter;
$t\_GKH = k2/LM$ = gas running time from said forward end to said second probe; and,
k1 and k2 = constants dependent upon the arrangement of said probes and the volume of said catalytic converter;
said time-determining apparatus including an integration unit for computing the time-dependent integral of an integration variable $\Delta\lambda\_V(t) \cdot LM(t)$ to thereby produce said value SPV for said oxygen storage capacity;
means for beginning said integration at time point $T\_0$ at which said first signal changes from rich to lean or vice versa; and,
means for ending said integration after a time interval $t\_S$ and said time integral being proportional to the storage capacity, wherein:
$\Delta\lambda\_V(t) = \lambda\_V(t) - 1$;
$LM(t)$ = air mass flow into the engine and therefore also into the catalytic converter.

* * * * *

UNITED STATES PATENT AND TRADEMARK OFFICE
CERTIFICATE OF CORRECTION

PATENT NO. : 5,335,538

DATED : August 9, 1994

INVENTOR(S) : Frank Blischke, Erich Schneider and Eberhard Schnaibel

It is certified that error appears in the above-identified patent and that said Letters Patent is hereby corrected as shown below:

In column 4, line 66: delete "t GKH" and substitute -- t_GKH -- therefor.

In column 6, line 43: delete "tile" and substitute -- the -- therefor.

In column 6, line 61: delete "tile" and substitute -- the -- therefor.

In column 7, line 1: between "start" and "the" (second occurrence), insert -- of --.

In column 8, line 9: between "content" and "the", insert -- of --.

In column 8, line 14: delete "sun, nation" and substitute -- summation -- therefor.

In column 8, line 17: delete "sun, hands" and substitute -- summands -- therefor.

Signed and Sealed this

Twenty-fourth Day of January, 1995

Attest:

BRUCE LEHMAN

Attesting Officer     Commissioner of Patents and Trademarks